United States Patent [19]

Suzuki et al.

[11] Patent Number: 5,754,698

[45] Date of Patent: May 19, 1998

[54] IMAGE SIGNAL ENCODING DEVICE HAVING FIRST AND SECOND ENCODING MEANS

[75] Inventors: Kazuhiro Suzuki; Yutaka Koshi; Koh Kamizawa; Setsu Kunitake, all of Kanagawa, Japan

[73] Assignee: Fuji Xerox Co., Ltd., Tokyo, Japan

[21] Appl. No.: 760,877

[22] Filed: Dec. 9, 1996

Related U.S. Application Data

[63] Continuation of Ser. No. 425,773, Apr. 20, 1995, abandoned, which is a continuation of Ser. No. 109,709, Aug. 20, 1993, abandoned.

[30] Foreign Application Priority Data

Aug. 21, 1992 [JP] Japan .................. 4-222988

[51] Int. Cl.$^6$ .................................................. G06K 9/36
[52] U.S. Cl. .................................................. 382/232
[58] Field of Search .................. 382/232, 270, 382/271, 272, 273, 254; 358/432, 433

[56] References Cited

U.S. PATENT DOCUMENTS

| | | | |
|---|---|---|---|
| 5,101,438 | 3/1992 | Kanda et al. | 358/432 |
| 5,144,688 | 9/1992 | Bovir et al. | 382/56 |
| 5,162,923 | 11/1992 | Yoshida et al. | 358/432 |
| 5,187,755 | 2/1993 | Aragaki | 382/43 |
| 5,227,875 | 7/1993 | Suu et al. | 358/133 |
| 5,229,864 | 7/1993 | Moronaga et al. | 358/433 |
| 5,235,420 | 8/1993 | Gharavi | 348/398 |
| 5,249,066 | 9/1993 | Fukuda | 358/427 |
| 5,253,075 | 10/1993 | Sugiyama | 358/433 |
| 5,276,525 | 1/1994 | Gharavi | 348/398 |
| 5,301,040 | 4/1994 | Hoshi | 358/465 |
| 5,331,427 | 7/1994 | Namizuka | 358/433 |
| 5,345,317 | 9/1994 | Katsuno et al. | 358/433 |
| 5,379,122 | 1/1995 | Eschbach | 358/433 |
| 5,412,429 | 5/1995 | Glover | 348/398 |
| 5,412,484 | 5/1995 | Yoshikawa | 358/433 |
| 5,416,606 | 5/1995 | Katayama | 358/433 |
| 5,426,673 | 6/1995 | Mitra et al. | 348/398 |
| 5,442,399 | 8/1995 | Asamura et al. | 348/398 |

FOREIGN PATENT DOCUMENTS

| | | | |
|---|---|---|---|
| 0 434 429 A2 | 6/1991 | European Pat. Off. | G06F 15/64 |
| 5-56282 | 3/1993 | Japan . | |
| 5-63989 | 3/1993 | Japan . | |
| 5-236450 | 9/1993 | Japan . | |

OTHER PUBLICATIONS

"A Study for High Resolution Color Image Coding Approach for Office System", Suzuki et al., Visual Communications and Image Processing '92, SPIE, vol. 1818, pp. 1554–1565, Nov. 1992.

Patent Abstracts of Japan Publication No. JP 5056282, dated May 3, 1993.

Patent Abstracts of Japan Publication No. JP 5063989, dated Dec. 3, 1993.

"High Resolution Color Image Coding Scheme for Office Systems", Koshi et al., *Visual Communications and Image Processing '91: Visual Communication, SPIE*, vol. 1605, pp. 362–373, Nov. 1991.

(List continued on next page.)

*Primary Examiner*—Jose L. Couso
*Attorney, Agent, or Firm*—Finnegan, Henderson, Farabow, Garrett & Dunner, L.L.P.

[57] ABSTRACT

An image signal encoding device which includes a code transforming unit. The code transforming unit includes a separation unit which separates mode information from first code data, a locally decoding unit which locally decodes the first code data using a decoding operation corresponding to the mode information and outputs locally decoded pixel block, and a second encoding unit which encodes the locally decoded pixel block using an encoding operation corresponding to the mode information and outputs second code data. According to the image signal encoding device, the first code data is re-encoded into the second code data having a higher compressibility so as to perform efficient data transmission and storage.

6 Claims, 12 Drawing Sheets

OTHER PUBLICATIONS

"A Study for High Resolution Color Image Coding Approch for Office System", Suzuki et al., *Visual Communications and Image Processing '92, SPIE*, vol. 1818, pp. 1554–1565, Nov. 1992.

"Image Encoding Algorithm II—Transformation Encoding-," *The Journal of the Institute of the Institute of Television Engineers in Japan*, vol. 43, No. 10, 1989, pp. 1145–1152 (in Japanese).

G.K. Wallace, "The JPEG Still Picture Compression Standard," IEEE Transactions on Consumer Electronics, pp. 1–77, Dec. 1991.

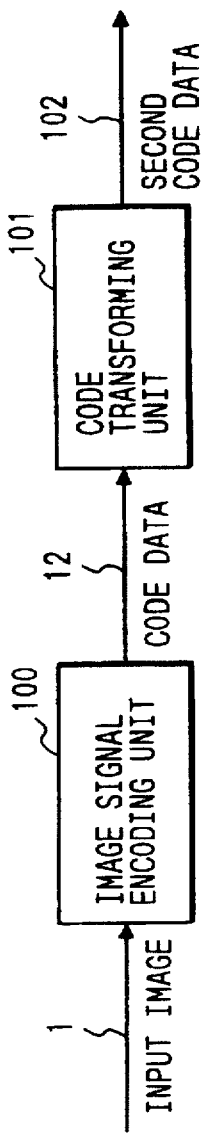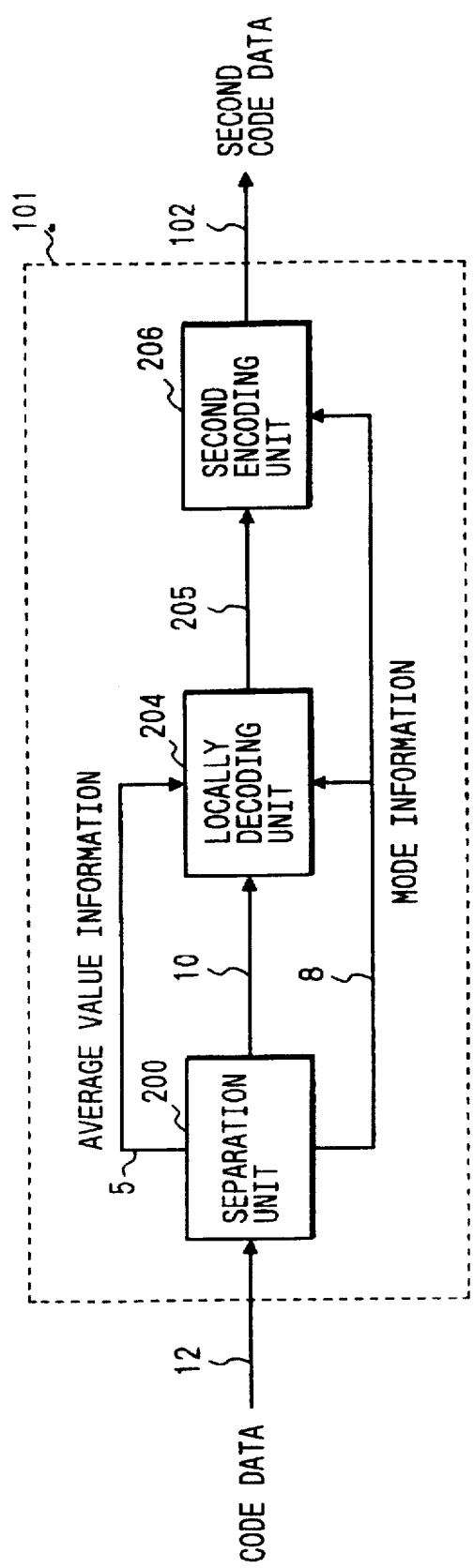

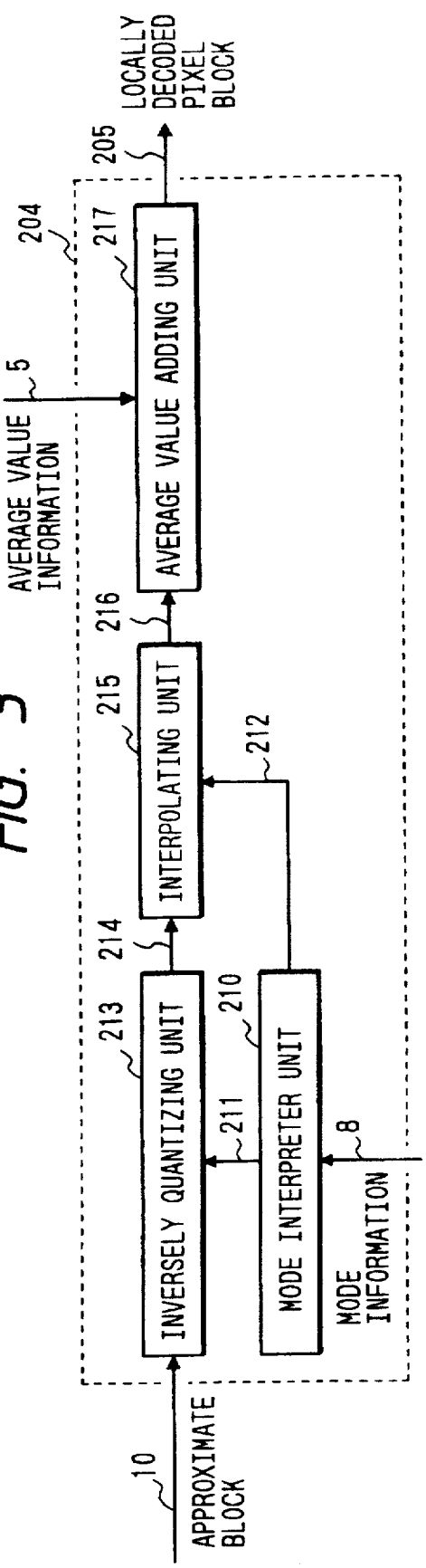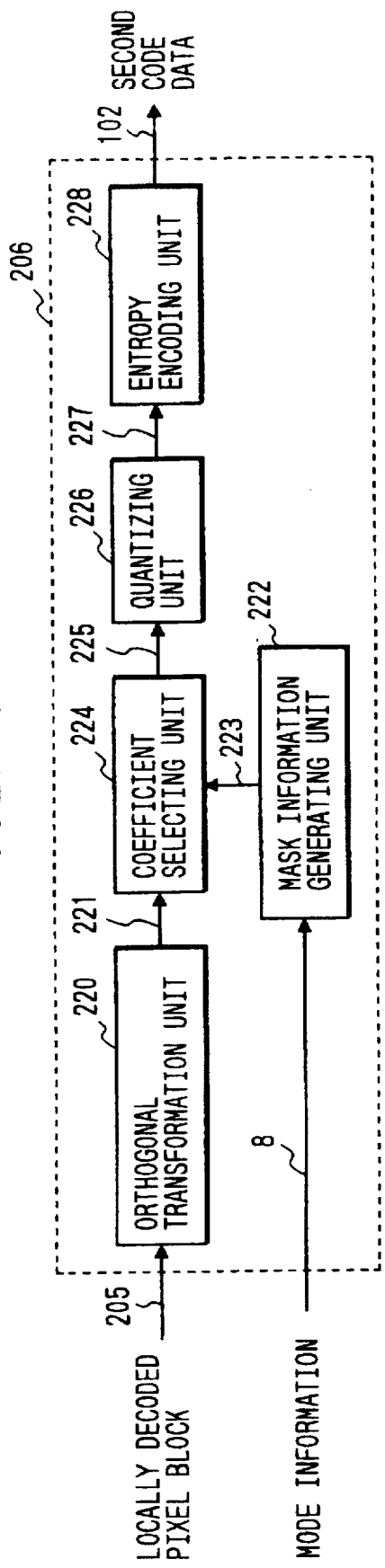

FIG. 6

| 0 | 30 | 60 | 90 | 120 | 150 | 180 | 210 |
|---|---|---|---|---|---|---|---|
| 0 | 30 | 60 | 90 | 120 | 150 | 180 | 210 |
| 0 | 30 | 60 | 90 | 120 | 150 | 180 | 210 |
| 0 | 30 | 60 | 90 | 120 | 150 | 180 | 210 |
| 0 | 30 | 60 | 90 | 120 | 150 | 180 | 210 |
| 0 | 30 | 60 | 90 | 120 | 150 | 180 | 210 |
| 0 | 30 | 60 | 90 | 120 | 150 | 180 | 210 |
| 0 | 30 | 60 | 90 | 120 | 150 | 180 | 210 |

| -184 | -547 | 0 | -57 | 0 | -17 | 0 | -4 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

(A) PIXEL BLOCK 1 (HORIZONTAL GRADATION)

(a) COEFFICIENT DISTRIBUTION IN DCT TRANSFORMATION OF PIXEL BLOCK 1

| 0 | 0 | 0 | 0 | 0 | 0 | 0 | 0 |
|---|---|---|---|---|---|---|---|
| 30 | 30 | 30 | 30 | 30 | 30 | 30 | 30 |
| 60 | 60 | 60 | 60 | 60 | 60 | 60 | 60 |
| 90 | 90 | 90 | 90 | 90 | 90 | 90 | 90 |
| 120 | 120 | 120 | 120 | 120 | 120 | 120 | 120 |
| 150 | 150 | 150 | 150 | 150 | 150 | 150 | 150 |
| 180 | 180 | 180 | 180 | 180 | 180 | 180 | 180 |
| 210 | 210 | 210 | 210 | 210 | 210 | 210 | 210 |

| -184 | 0 | 0 | 0 | 0 | 0 | 0 | 0 |
|---|---|---|---|---|---|---|---|
| -547 | 0 | 0 | 0 | 0 | 0 | 0 | 0 |
| 0 | 0 | 0 | 0 | 0 | 0 | 0 | 0 |
| -57 | 0 | 0 | 0 | 0 | 0 | 0 | 0 |
| 0 | 0 | 0 | 0 | 0 | 0 | 0 | 0 |
| -17 | 0 | 0 | 0 | 0 | 0 | 0 | 0 |
| 0 | 0 | 0 | 0 | 0 | 0 | 0 | 0 |
| -4 | 0 | 0 | 0 | 0 | 0 | 0 | 0 |

(B) PIXEL BLOCK 2 (VERTICAL GRADATION)

(b) COEFFICIENT DISTRIBUTION IN DCT TRANSFORMATION OF PIXEL BLOCK 2

| 40 | 40 | 40 | 40 | 40 | 40 | 40 | 40 |
|---|---|---|---|---|---|---|---|
| 40 | 40 | 40 | 40 | 40 | 40 | 40 | 200 |
| 40 | 40 | 40 | 40 | 40 | 40 | 200 | 200 |
| 40 | 40 | 40 | 40 | 40 | 200 | 200 | 200 |
| 40 | 40 | 40 | 40 | 200 | 200 | 200 | 200 |
| 40 | 40 | 40 | 200 | 200 | 200 | 200 | 200 |
| 40 | 40 | 200 | 200 | 200 | 200 | 200 | 200 |
| 40 | 200 | 200 | 200 | 200 | 200 | 200 | 200 |

| -144 | -364 | 0 | -38 | 0 | -11 | 0 | -3 |
|---|---|---|---|---|---|---|---|
| -364 | 80 | 167 | 0 | 30 | 0 | 9 | 0 |
| 0 | 167 | -80 | -95 | 0 | -19 | 0 | -4 |
| -38 | 0 | -95 | 80 | 61 | 0 | 12 | 0 |
| 0 | 30 | 0 | 61 | -80 | -41 | 0 | -6 |
| -11 | 0 | -19 | 0 | -41 | 80 | 26 | 0 |
| 0 | 9 | 0 | 12 | 0 | 26 | -80 | -14 |
| -3 | 0 | -4 | 0 | -6 | 0 | -14 | 80 |

(C) PIXEL BLOCK 3 (OBLIQUE EDGE)

(c) COEFFICIENT DISTRIBUTION IN DCT TRANSFORMATION OF PIXEL BLOCK 3

FIG. 9

| GROUP NO. (ENCODING SYMBOL) | DIFFERENCES IN D.C. COMPONENTS | NUMBER OF ADDITIONAL BITS |
|---|---|---|
| 0 | 0 | 0 |
| 1 | -1, 1 | 1 |
| 2 | -3, -2, 2, 3 | 2 |
| 3 | -7···, -4, 4, ···7 | 3 |
| 4 | -15···, -8, 8, ···15 | 4 |
| 5 | -31···, -16, 16, ···31 | 5 |
| 6 | -63···, -32, 32, ···63 | 6 |
| 7 | -127···, -64, 64, ···127 | 7 |
| 8 | -255···, -128, 128, ···255 | 8 |
| 9 | -511···, -256, 256, ···511 | 9 |
| 10 | -1023···, -512, 512, ···1023 | 10 |
| 11 | -2047···, -1024, 1024, ···2047 | 11 |
| 12 | -4095···, -2048, 2048, ···4095 | 12 |
| 13 | -8091···, -4096, 4096, ···8091 | 13 |
| 14 | -16383···, -8092, 8092, ···16383 | 14 |
| 15 | -32767···, -16384, 16384, ···32767 | 15 |

FIG. 10

| RUN \ SIZE | 0 | 1 | 2 | 3 | 4 | 5 | ... | 15 |
|---|---|---|---|---|---|---|---|---|
| 0 | 0 | 1 | 2 | 3 | 4 | | | |
| 1 | 16 | 17 | 18 | 19 | | | | |
| 2 | 32 | | | | | | | |
| : | : | | ENCODING SYMBOL DEPENDING ON COMBINATION OF RUN AND SIZE | | | | | |
| 15 | 240 | ..... | | | | | | 255 |

SIZE : GROUP NUMBER OF LEVEL VALUES OF VALID COEFFICIENTS
RUN  : RUNS OF INVALID COEFFICIENTS FROM 0 TO 15

HOWEVER, WHEN SIZE = 0,

RUN =0 : END OF BLOCK
    =15 : 16 INVALID COEFFICIENT RUNS
          (FOR 16 OR MORE RUNS, THIS WILL BE REPEATED)

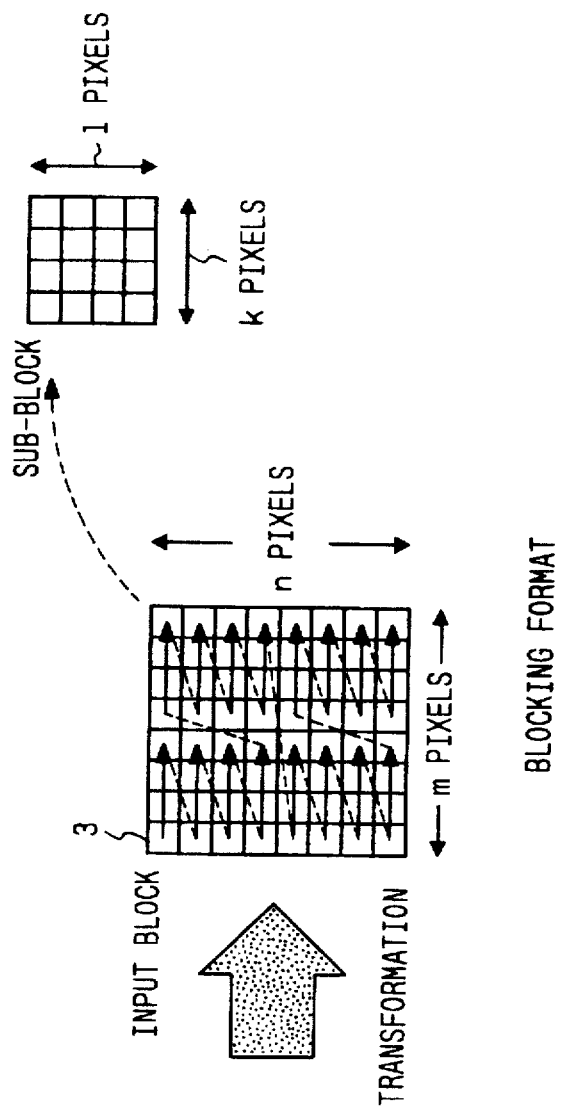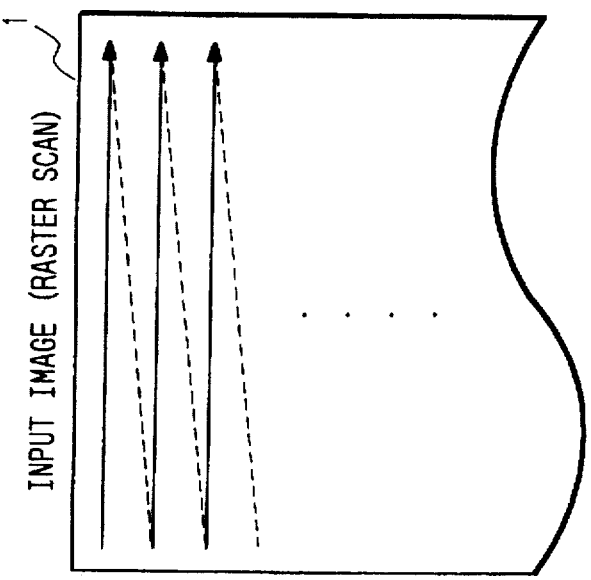
FIG. 13
PRIOR ART

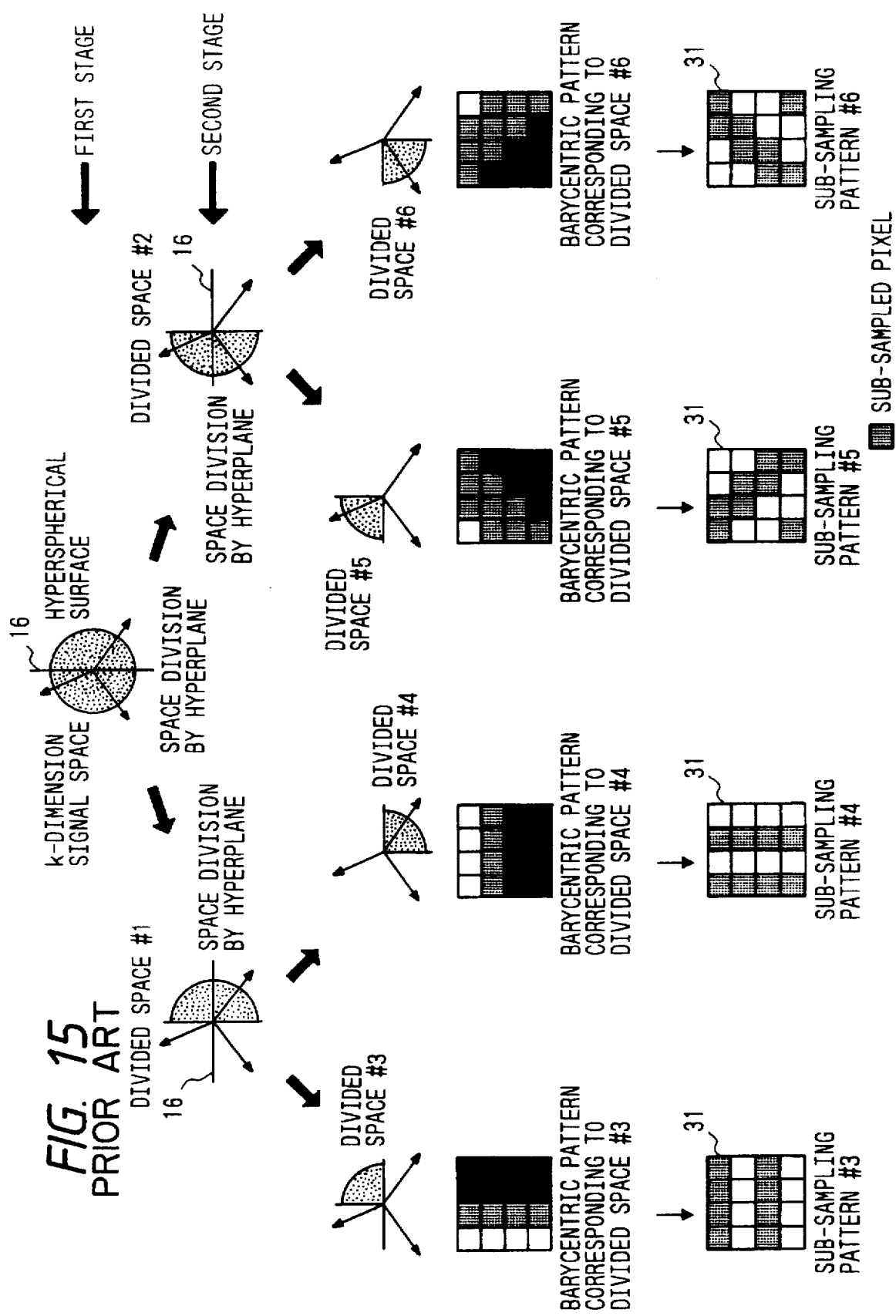

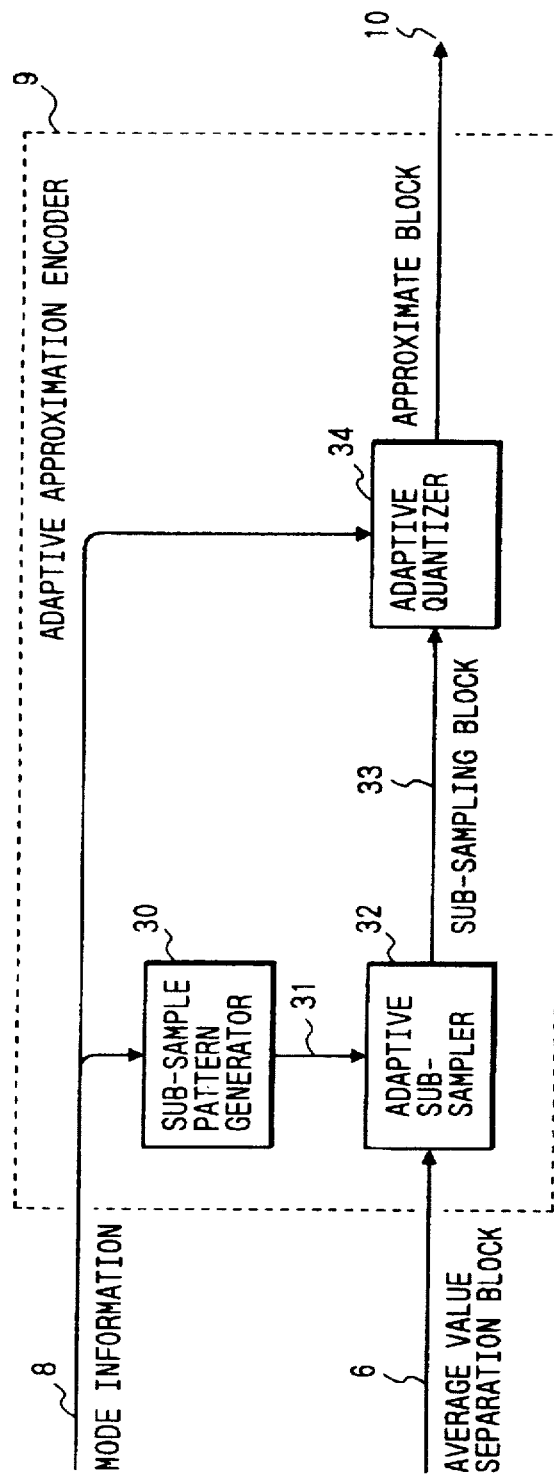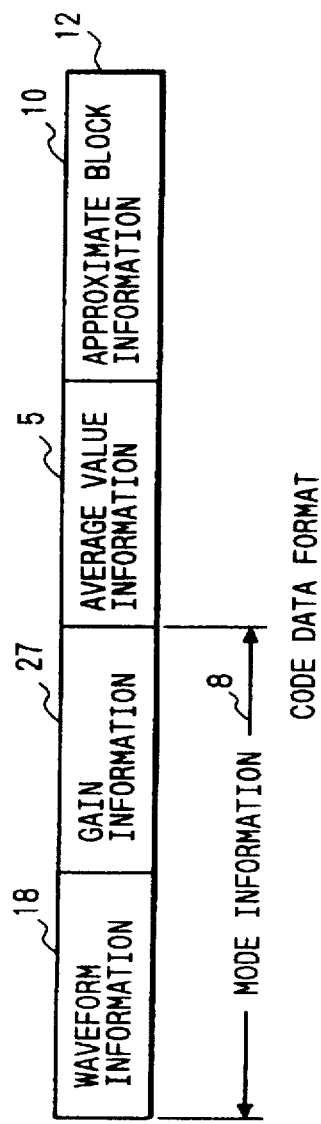

IMAGE SIGNAL ENCODING DEVICE HAVING FIRST AND SECOND ENCODING MEANS

This is a continuation of application Ser. No. 08/425,773 filed Apr. 20, 1995, now abandoned which is a continuation of Ser. No. 08/109,709, filed Aug. 20, 1993, now abandoned.

BACKGROUND OF THE INVENTION

1. Field of the Invention

The present invention relates to a device for encoding an image signal.

2. Description of the Related Art

A device for receiving a manuscript as a digital image signal and performing an editing processing on the manuscript digital image signal, includes a page memory that is used to store the data of the image temporarily.

In recent years, the capacity of the page memory has increased as the resolution of the image to be processed and the number of the colors of the image increased. This leads to the two following problems.

That is, the price of the page memory has increased, while a time necessary to read out an image from the page memory and a time necessary to write the image into the page memory have also increased.

To solve these problems, there is proposed an image encoding technique which aims at reducing a page memory, as disclosed in Japanese Patent Unexamined Publication No. Hei. 5-56282.

The method disclosed in the above-mentioned Japanese Patent Unexamined Publication No. Hei. 5-56282 aims mainly at satisfying the three following requirements.

A first requirement is that an image can be encoded at a uniform compressibility independently of the image.

A second requirement is that an image divided into a given number of units can be encoded in a given amount of codes.

A third requirement is that encoding/decoding processing can be executed at a high and constant speed.

Description will be given below of an image encoding device which is disclosed in the above-mentioned Japanese Patent Unexamined Publication No. Hei. 5-56282.

FIG. 12 is a block diagram showing the structure of the image encoding device. In FIG. 12, reference numeral 1 designates an input image which is input by a raster scan shown in FIG. 13, reference numeral 3 designates an input block consisting of mxn pixels converted or transformed by a blocking section 2 as shown in FIG. 13, reference numeral 5 designates average value information which is calculated by an average value separator 4, reference numeral 6 designates an average value separation block obtained by subtracting an average value from the input block 3 by the average value separator 4, reference numeral 8 designates an approximate parameter or mode information obtained by a mode discriminator 7, reference numeral 10 an designates approximate block obtained when an adaptive approximation encoder 9 performs a resolution approximation and a gradation approximation on the average value separation block 6, and reference numeral 12 designates code data which is multiplexed by a multiplexer 11. The blocking section 2 is used to convert the scan order of the input image 1 from a raster scan into a blocking format as shown in FIG. 13. The average value separator 4 is used to calculate the average value of the input block 3 and subtract the average value from the input block 3. The mode discriminator 7 is used to analyze the statistic and spatial characteristic amounts of the average value separation block 6 and to obtain an approximate parameter in approximation encoding in accordance with the results of the analysis. The adaptive approximation encoder 9 performs a resolution approximation and a gradation approximation. The multiplexer 11 is used to multiplex the average value information 5 and mode information 8 as well as the approximation block 10.

FIG. 14 shows a block diagram of the structure of the mode discriminator 7 shown in FIG. 12. In FIG. 14, reference numeral 16 designates a vector index showing a representative vector which is selected by a pattern matching device 15, reference numeral 18 designates a parameter candidate value, i.e., waveform information relating to a resolution approximation to be output from a waveform mapping table 17, reference numeral 23 designates a variance value which is output from a variance calculator 22, reference numeral 25 designates histogram information which is output by a histogram counter 24, reference numeral 27 designates a parameter candidate value, that is, gain information relating to the gradation approximation, and reference numeral 14 designates a waveform analyzer which is used to analyze the waveform information of the statistic and spatial characteristic amounts as shown in FIG. 15. The pattern matching device 15 is used to perform pattern matching between the set of the representative vector having representative waveform information and the average value separation block 6 consisting of mxn pixels to thereby select a representative vector having the nearest waveform information. The waveform mapping table 17 obtains a parameter candidate value on the resolution approximation from the vector index 16. A gain analyzer 20 is used to analyze the gain information in the block consisting of mxn pixels shown in FIG. 13 out of the statistic and spatial characteristic amounts. The variance calculator 22 is used to calculate the variance value of the value of mxn pixels of the average value separation block 6. The histogram counter 24 counts the frequency distribution of the value of mxn pixels of the average value separation block 6. A gain mapping table 26 obtains a parameter candidate value on the gradation approximation from the variance value 23 and histogram information 25. A mode judging device 21 obtains the mode information 8, i.e., an approximate parameter from the waveform information 18 and gain information 27.

Referring now to FIG. 16, there is shown a block diagram of the structure of the adaptive approximation encoder 9 shown in FIG. 12. In FIG. 16, reference numeral 33 designates a sub-sample block which is sub-sampled by an adaptive sub-sampler 32, and reference numeral 30 designates a sub-sample pattern generator which, in accordance with the parameter on the resolution approximation of the mode information 8, obtains a sub-sample pattern 31 for controlling a sub-sampling operation to be performed of the resolution approximation. The adaptive sub-sampler 32 sub-samples the mxn pixels of the average value separation block 6 in accordance with the sub-sample pattern 31 to be output from the sub-sample pattern generator 30, and an adaptive quantizer 34 carries out a gradation approximation operation, that is, quantizes the gradation approximation in accordance with the parameter on the gradation approximation of the mode information 8.

Next, description will be given below of the operation of the above-mentioned image encoding device with reference to FIGS. 12, 14, and 16. As shown in FIG. 13, the input image 1, which is input by the raster scan is scan converted into the input block 3 consisting of mxn pixels by the blocking section 2. Then, all encoding processings are performed independently of one another in blocks with the input block 3 as a unit.

The average value separator 4 shown in FIG. 12 calculates the average value μ of the value $S_{ij}$ (i=1, 2, ..., m, j=1, 2, ..., n) of the mxn pixels forming the input block 3, that is, the average value information 5 and, then, subtracts the average value μ from the respective pixel values of the mxn pixels forming the input block 3, and calculates the average value separation block 6 from the values $X_{ij}$ (i=1, 2, ..., m, j=1, 2, ..., n) of the mxn pixels that have received the average value separation processings. Here, $S_{ij}$, μ and $X_{ij}$ are expressed by the following mathematical equation:

$$\mu = \left( \sum_{i=1}^{m} \sum_{j=1}^{n} S_{ij} \right) / (m \times n)$$

$$X_{ij} = S_{ij} - \mu$$

The mode discriminator 7 shown in FIG. 12 analyzes the statistic and spatial characteristic amounts of the average value separation block 6 and outputs the mode information 8, i.e., the approximate parameter in accordance with the analysis results. As shown in FIG. 14, the waveform analyzer 14, which is a component of the mode discriminator 7, analyzes the waveform information to obtain the candidate value of the resolution approximate parameter. Likewise, the gain analyzer 20 analyzes the gain information to thereby obtain the candidate value of the gradation approximation parameter. Similarly, the mode judging device 21 obtains the approximate parameter, that is, the mode information 8 from the resolution approximate parameter candidate value and gradation approximate parameter candidate value.

The waveform analyzer 14 shown in FIG. 14 analyzes the waveform information that represents the two-dimensional direction and complexity of the gradation variations of the average value separation block 6 and, from the analysis results thereof, obtains a resolution approximate parameter candidate value for approximation of the resolution of the average value separation block 6.

As shown in FIG. 15, the pattern matching device 15 (see e.g. FIG. 14) pattern matches a representative vector set including previously prepared representative waveform information with an analysis target block (which will hereinafter be referred to as an analysis block), that is, the average value separation block 6 to thereby carry out a waveform information analysis. Thus, the direction and complexity of the gradation variations of the analysis block can be obtained by means of the waveform information analysis, while the vector index 16 can be obtained from the index of the representative vector. When an analysis block of mxn pixels is expressed as x={$x_i$|i=1, 2, ..., mxn} and a representative vector set consisting of k pcs. of representative vectors is expressed as Y={$Y_i$|i=1, 2, ..., k}, then a pattern matching can be defined by the following equation.

For every i, $d(x,y_p)=\min\{d(x,y_i)\}$ (i=1, 2, ..., k), where $d(x,y_i)$ is a distortion measure and can be defined by means of a square distortion or the like. p is the index of a representative vector, that is, the vector index 16, and this shows that a representative vector $x_p$ represented by p has been selected as the representative vector that includes the nearest waveform information to the analysis block.

The waveform mapping table 17 shown in FIG. 14 obtains a resolution approximate parameter candidate value, i.e., obtains the waveform information 18 from the vector index 16. The resolution approximate parameter candidate value consists of the direction v(p) of the analysis block representing the two-dimensional direction of the gradation variations and a sub-sample rate r(p) representing the complexity of the gradation variations.

The gain analyzer 20 shown in FIG. 14 analyzes the gain information that represents the frequency distribution of the amplitudes and pixel values of the average value separation block 6 and, from the analysis results thereof, obtains a gradation approximate parameter candidate value for approximation of the gradation of the average value separation block 6. The gain information analysis can be performed by counting the variance value $\sigma^2$ of the values of the mxn pixels constituting the average value separation block 6 and the histogram thereof.

The variance calculator 22 shown in FIG. 14 calculates the variance value $\sigma^2$ of the values of the mxn pixels constituting the average value separation block 6, i.e., the variance value 23. The variance value of the mxn pixels with the average value separated therefrom can be defined by the following equation.

$$\sigma^2 = \left( \sum_{i=1}^{m} \sum_{j=1}^{n} X_{ij}^2 \right) / (m \times n)$$

Or, description will be given hereinafter by use of the variance value σ.

$$\sigma = \left( \sum_{i=1}^{m} \sum_{j=1}^{n} |X_{ij}| \right) / (m \times n)$$

The histogram counter 24 shown in FIG. 14, as shown in FIG. 17, performs a threshold value processing on the average value separation block 6 by means of the variance value a to thereby count the frequency. That is, the threshold values are set to ±σ/a and the frequency is counted in three ranges consisting of a range of less than −±σ/a, a range of −σ/a to σ/a, and a range of more than σ/a. Here, a is a real number which is 1 or more. In the present embodiment, for example, a=3. The frequency values counted in the three ranges are expressed as $H_{-1}$, $H_0$, and $H_1$, respectively. As shown in FIG. 17, from $H_{-1}$, $H_0$, and $H_1$, it is judged whether the histogram is a unimodal distribution or a bimodal distribution and the result of this judgement is obtained as the histogram information 25. For example, when $H_{-1} \leq H_0$ and $H_0 \geq H_1$, then the histogram is judged as a unimodal distribution and, in other cases, the histogram is judged as a bimodal distribution.

The gain mapping table 26 shown in FIG. 14 obtains a gradation approximate parameter candidate value, i.e., the gain information 27 from the variance value 23 and histogram information 25. The gradation approximate parameter candidate value consists of a gradation approximation, that is, the characteristic c of quantization and the number of levels 1.

The mode judging device 21 shown in FIG. 14 obtains an approximate parameter, that is, the mode information 8 from the resolution approximate parameter candidate value and gradation approximate parameter candidate value. When performing a fixed length encoding operation to control an amount of codes to a given amount in each of mxn pixels, by operating the sub-sample rate r of the resolution approximate parameter candidate value in connection with the code amount and the number of levels 1 of the gradation approximate parameter candidate value, the data amount of the approximate block 10 is set to a given amount. Here, the data amount of the approximate block 10 is proportional to p·$\log_2$ 1 and, therefore, the value of p·$\log_2$ 1 may be controlled to a given value. The thus controlled resolution approximate parameter and gradation approximate parameter are combined together and are then output as the mode information 8. Also, if the respective resolution approximate parameter candidate value and gradation approximate parameter candidate value are used as the mode information 8 as they are, then the quality of the reproduced image can be maintained at a given level.

The adaptive approximation encoder 9 shown in FIG. 12 carries out the approximation of the resolution as well as the approximation of the gradation in accordance with the mode information 8.

The sub-sample pattern generator 30 shown in FIG. 16 obtains the pattern 31 for sub-sampling the average value separation block 6 in accordance with the gradation approximate parameter of the mode information 8, i.e., the analysis block direction v which represents the two-dimensional direction of the gradation variations as well as the sub-sample rate r which represents the complexity of the gradation variations. The pattern 31 is determined by combination of the direction v with the rate r. For example, the pattern 31 includes a pattern in which a block consisting of mxn pixels is thinned out to half only in the longitudinal direction thereof, a pattern in which the block is thinned out to half only in the transverse direction thereof, a pattern in which the block is thinned out to half in both longitudinal and transverse directions thereof, and other patterns.

The adaptive sub-sampler 32 shown in FIG. 16 sub-samples the average value separation block 6 in accordance with the sub-sampling pattern 31.

The adaptive quantizer 34 shown in FIG. 16 quantizes the sub-sample block 33 in accordance with the gradation approximate parameter of the mode information 8, i.e., the characteristic c of the quantization and the number 1 of the quantization levels. As shown in FIG. 17, when the quantization characteristic c is a unimodal distribution, a quantizer is selected which is ideally suited for the unimodal distribution and, when the quantization characteristic c shows a bimodal distribution, a quantizer is selected which is ideally suited for the bimodal distribution. Here, the quantizer may be for example, a non-linear quantizer such as an optimum quantizer which performs a quantizing operation in view of the maximum value of distribution for each distribution. Quantizers should be prepared in accordance with the combinations of the quantization characteristic c with the quantization level number 1, respectively.

The multiplexer 11 shown in FIG. 12 multiplexes the mode information 8, average value information 5, and approximate block 10 to thereby make up the code data 12 as shown in FIG. 18.

On the other hand, as a highly efficient encoding method for communication and storage, there is known an encoding method on the basis of a Discrete Cosine Transformation (which will hereinafter be abbreviated to DCT) which is a kind of orthogonal transformation (Hideo Hashimoto, Introduction to Image Compression, "Image Encoding Algorithm II -Transformation Encoding-,". The Journal of the Institute of Television Engineers of Japan, Vol. 43, No. 10, 1989, pp. 1145–1152.)

Description will be given below of the orthogonal transformation. For an image signal, a two-dimensional orthogonal transformation is employed which uses a correlation between horizontal and vertical directions. A pixel block is constructed which includes M pixels and N pixels in the horizontal and vertical directions respectively, and one-dimensional orthogonal transformation is carried out in the horizontal and vertical directions independently of each other. These processings can be expressed by the following equation (1):

$$Y = A_N X A_M^T \quad (1)$$

where X is a pixel block consisting of N rows and M columns, Y is a coefficient of transformation, and $A_N$, $A_M$ are orthogonal transformation matrixes respectively of degree N and degree M.

Various kinds of orthogonal transformation methods are available and, in view of encoding efficiency, the DCT method is generally used. For example, a two-dimensional DCT of degree N can be given by the following equation (2), while inverse transformation thereof can be given by the following equation (3).

$$Y(u,v) = \quad (2)$$

$$\frac{4C(u)C(v)}{N^2} \sum_{j=0}^{N-1} \sum_{k=0}^{N-1} X(j,k) \cdot \cos\left[\frac{(2j+1)u\pi}{2N}\right] \cos\left[\frac{(2k+1)v\pi}{2N}\right]$$

$$X(j,k) = \quad (3)$$

$$\sum_{u=0}^{N-1} \sum_{v=0}^{N-1} C(u)C(v)Y(u,v) \cdot \cos\left[\frac{(2j+1)u\pi}{2N}\right] \cos\left[\frac{(2k+1)v\pi}{2N}\right]$$

$$C(w) = \begin{cases} \frac{1}{\sqrt{2}} & w = 0 \\ 1 & w = 1,2,\ldots,N-1 \end{cases} \quad (4)$$

where X(j,k) represents the respective elements of the pixel block 102 and j, k respectively express the positions of the elements. Y(u,v) represent the respective elements of the transformation coefficients and u, v express the positions of the elements.

In an image signal called a natural image such as a person, background and the like, it is known that mutually adjoining pixels tend to take near pixel values and have a high correlativity. Such a signal of high correlativity means, when viewed on a frequency axis, that an electric power signal is distributed collectively to a specific frequency component. By encoding only the coefficient of the component to which the signal power is distributed collectively, it is possible to reduce the amount of information as a whole. In the natural image, by carrying out the DCT method, most of the signal power is centered on a low frequency area.

However, in the DCT method, there are known problems in that the encoding efficiency is lowered if an edge is included in the image, and in that specific image quality deterioration occurs in the neighborhood of the edge of a decoded image. This is because, in a pixel block including an edge, the signal power is not centered on a specific coefficient but is dispersed over to a wide range of coefficients. A method of reducing the image quality deterioration when such an image including an edge is encoded according to the DCT method is disclosed in Japanese Patent Unexamined Publication No. Hei. 5-63989.

In the method disclosed in Japanese Patent Unexamined Publication No. Hei. 5-63989, at first, the waveform of the pixel block is analyzed by use of pattern matching and variance calculation. Next, there is selected from the analysis results mask information which decides the significance an insignificance of the DCT coefficients. In the DCT coefficients, a coefficient at a position where the mask information is insignificant is forced to 0 forcibly. After the above coefficient select processing, entropy encoding is executed.

The method disclosed in the above-mentioned Japanese Patent Unexamined Publication No. Hei. 5-56282, however, has two problems as follows:

Firstly, in an image, there are variations, such as character areas, blank space areas and the like, which are present locally and have a statistic character. However, in the method disclosed in the above Japanese Patent Unexamined Publication No. Hei. 5-56282, for the purpose of keeping a two-dimensional position relationship between the image and code data, the image divided into a given number of unit sub-portions is encoded in a constant amount of codes. For this reason, redundancy exists in the encoded data.

Secondly, because the method is developed mainly for internal use of the encoding device, it is not compatible with other encoding methods which are used externally of the encoding device.

Therefore, when the method disclosed in the above Japanese Patent Unexamined Publication No. Hei. 5-56282 is used for communication and storage, it is expected that the code data encoded according to the method is once decoded and after then the decoded data is encoded again with high efficiency.

However, due to the fact that the method disclosed in the above Japanese Patent Unexamined Publication No. Hei. 5-56282 uses an algorithm based on block approximation encoding, an edge in the decoded image is approximated by a small number of representative gradations, with the result that the edge is emphasized. For this reason, it is not desirable to again encode the decoded image directly according to the DCT method from the viewpoint of efficiency and image quality.

SUMMARY OF THE INVENTION

The present invention aims at eliminating the problems found in the above-mentioned methods and devices. Accordingly, it is an object of the invention to provide an image signal encoding device which can transform the code data into the code data that can be decoded with an improved efficiency and by a decoding device provided external to the present encoding device.

Also, it is another object of the invention to provide an image signal encoding device which uses the results of analysis of the characteristics of pixel distributions by pixel blocks contained in the code data to thereby be able to reduce the deterioration of the image when the image is re-encoded.

In attaining the above-mentioned objects, the invention provides an image signal encoding device including: dividing means for dividing an image signal into a plurality of rectangular pixel blocks; average value separator means for calculating an average value of pixels in each of the pixel blocks and subtracting the average value from each of the values of the pixels of the pixel block; mode discriminator means for analyzing characteristics of resolution and gradation variations in an average value separation pixel block obtained by the average value separator means and outputting mode information which is defined in correspondence to the characteristics of the pixel distribution in the average value separation pixel block; first encoding means for encoding the average value separation pixel block by means of an encoding operation which is defined by the mode information; multiplexer means for multiplexing the encoded results output from the first encoding means, the average value output from the average value separation means, and the mode information and outputting first code data; separation means for separating the mode information from the first code data; locally decoding means for locally decoding the first code data by means of a decoding operation corresponding to the mode information and outputting a locally decoded pixel block; and second encoding means for encoding the locally decoded pixel block by means of an encoding operation corresponding to the mode information and outputting second code data.

BRIEF DESCRIPTION OF THE DRAWINGS

FIG. 1 is a block diagram showing the structure of a first embodiment of an image signal encoding device according to the invention;

FIG. 2 is a block diagram showing the structure of a code transforming unit employed in the first embodiment according to the invention;

FIG. 3 is a block diagram showing the structure of a locally decoding unit employed in the first embodiment according to the invention;

FIG. 4 is a block diagram showing the structure of a second encoding unit employed in the first embodiment according to the invention;

FIG. 6 is a table showing examples of the distribution of pixel values in a block and the distribution of DCT coefficients;

FIG. 9 is a table showing groups by differences in direct current components;

FIG. 10 is a table showing encoding symbols in alternating current components;

FIG. 13 is a prior art explanatory view showing the scan transformation of an image;

FIG. 15 is prior art a view for explaining the waveform information analysis;

FIG. 16 is a prior art block diagram showing the structure of an adaptive approximation encoder employed in the proposed image signal encoding device;

FIG. 18 is an explanatory view showing the code structure.

DESCRIPTION OF THE PREFERRED EMBODIMENTS

Figure 12:
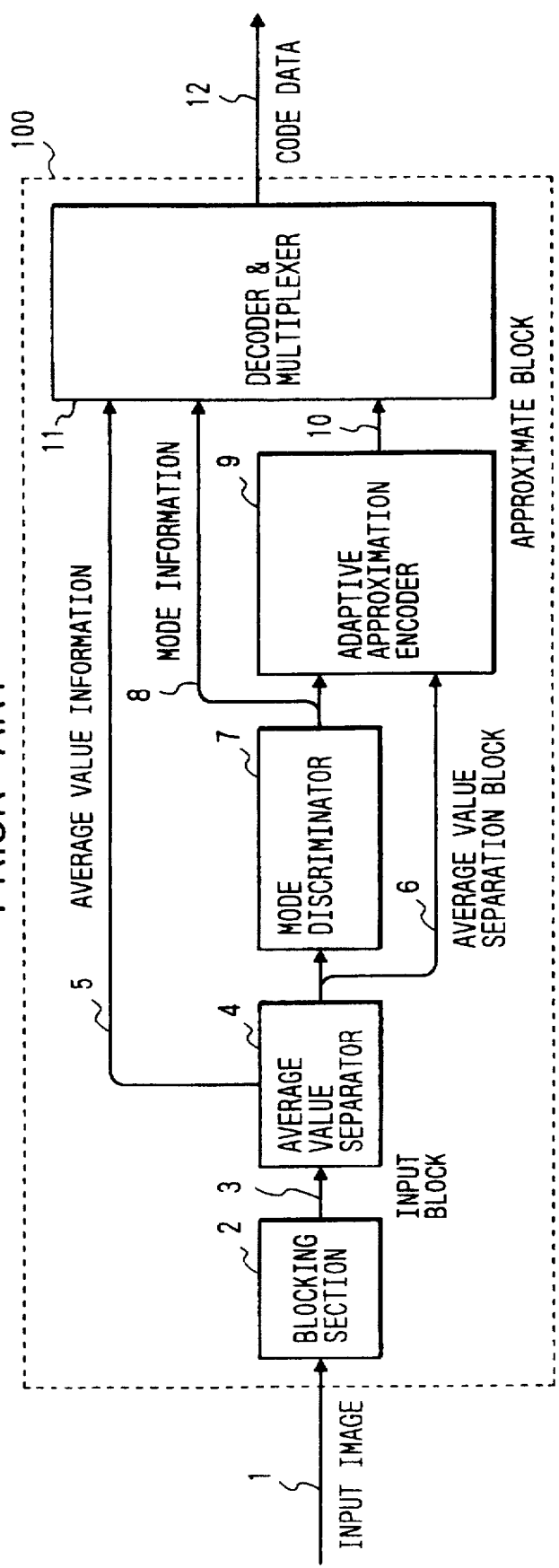
FIG. 12 is a prior art block diagram showing the structure of a proposed image signal encoding device.
Figure 14:
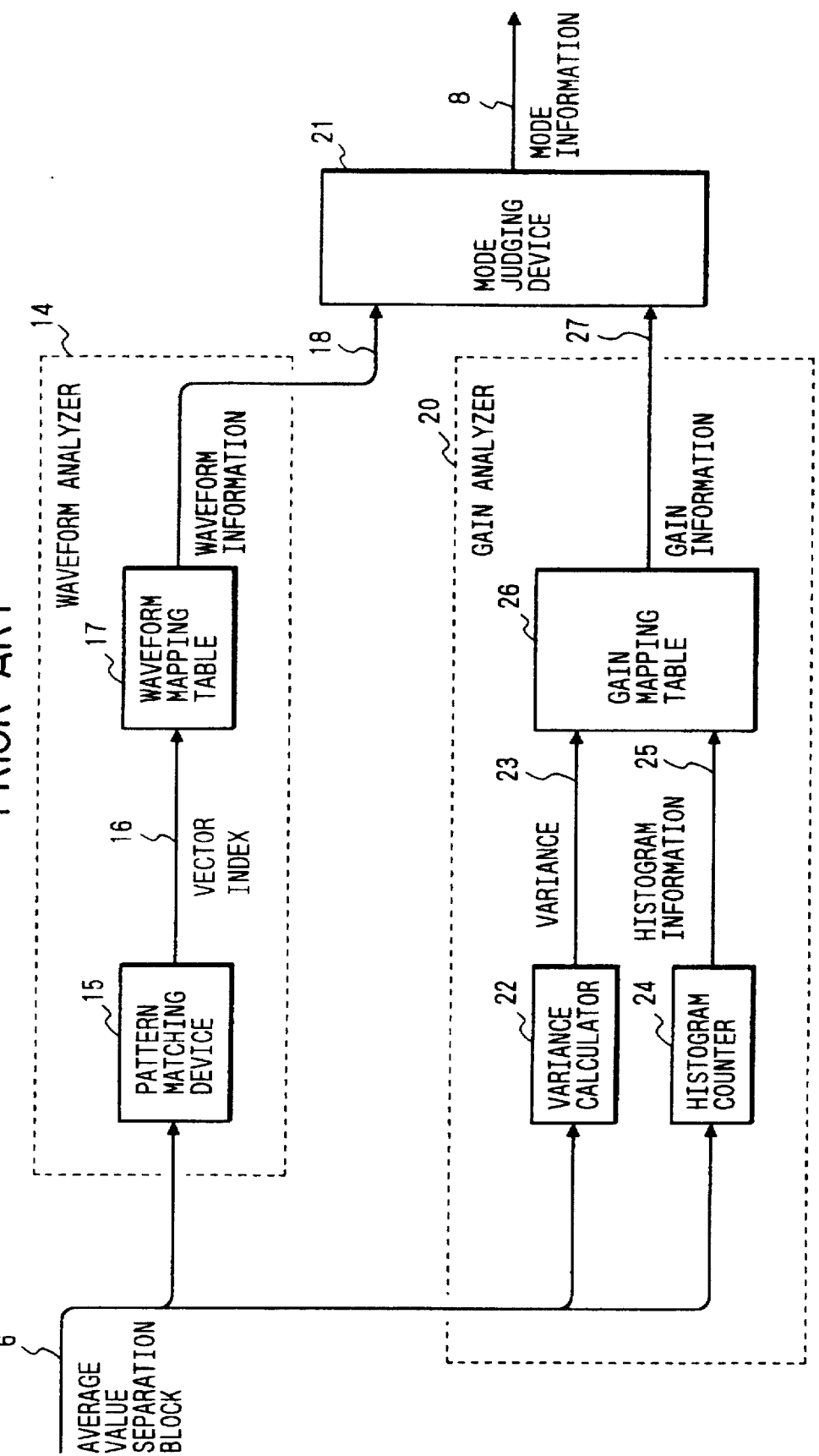
FIG. 14 is a prior art block diagram showing the structure of a mode discriminator employed in the proposed image signal encoding device.
Figure 17:
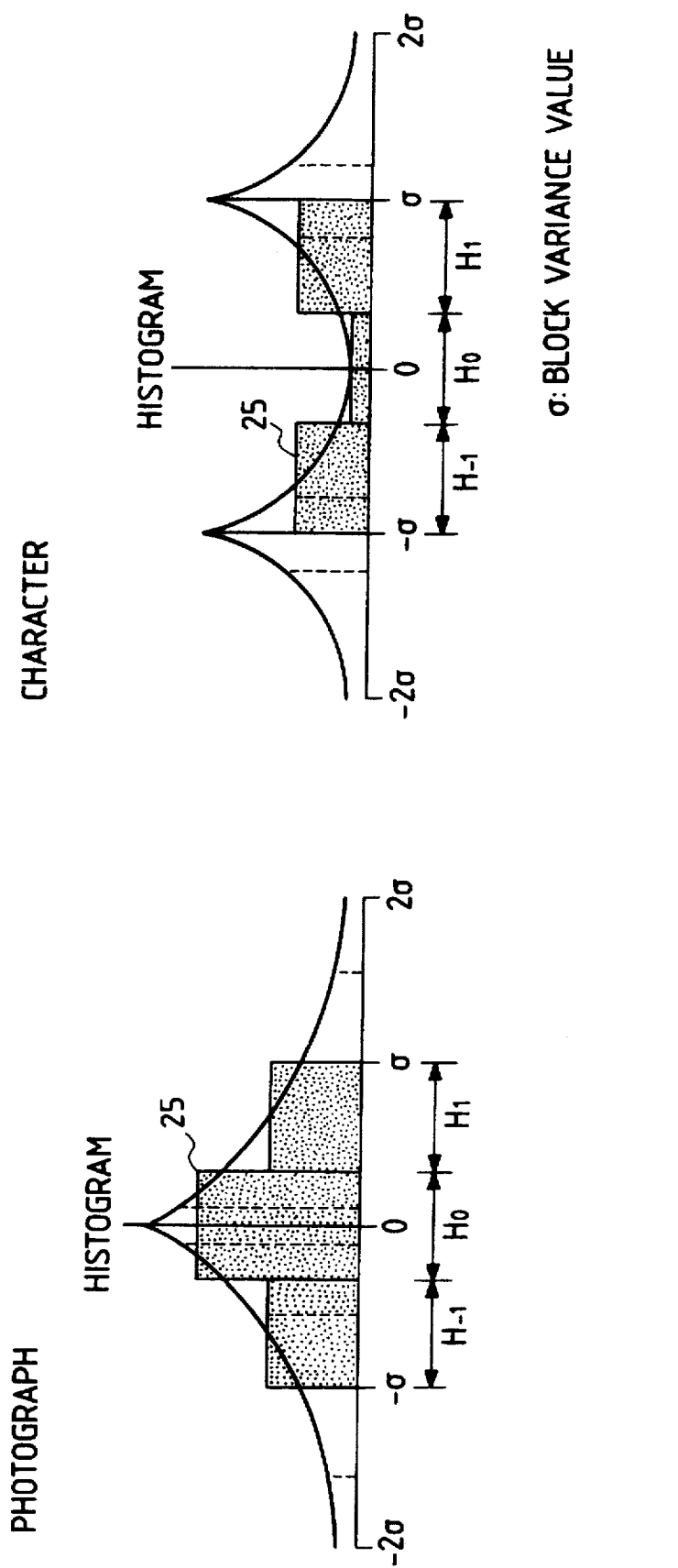
FIG. 17 is a view for explaining the gain information analysis.

FIG. 1 is a block diagram showing the structure of a first embodiment of an image signal encoding device according to the invention. In FIG. 1, portions corresponding to those of the proposed device shown in FIG. 12 are given the same reference numerals.

Reference numeral 1 designates an input image which is input by the raster scan shown in FIG. 13, reference numeral 12 designates code data which is encoded by an image signal encoding unit 100, and reference numeral 102 designates second code data which is transformed by a code transforming unit 101. The image signal encoding unit 100 encodes the input image 1 according to the method previously set forth in the description of the related art in the present specification and outputs the code data 12. The code transforming unit 101 locally decodes the code data 12 and then encodes again the decoded data according to an algorithm different from the image signal encoding unit 100 to thereby transform the code thereof, and after then outputs the code data 102.

The image signal encoding unit 100 shown in FIG. 1 is the same as has been previously set forth in the description of the related art in the present specification and thus the description thereof is omitted here.

FIG. 2 is a block diagram showing the structure of the code transforming unit 101 shown in FIG. 1. In FIG. 2, reference numeral 5 designates average value information which is separated from the code data 12 by a separation unit 200, reference numeral 10 designates an approximate block which is separated from the code data 12 by the separation unit 200, reference numeral 8 designates mode information which is separated from the code data 12 by the separation unit 200, and reference numeral 205 designates a locally decoded pixel block which is decoded by a locally decoding unit 204. The separation unit 200 separates the average value information 5, approximate block 10 and mode information 8 from the code data 12. The locally decoding unit 204 decodes the locally decoded pixel block 205 from the average value information 5, approximate block 10 and mode information 8. A second encoding unit 206 again encodes the locally decoded pixel block 205 in accordance with the mode information 8 and then outputs second code data 102.

FIG. 3 is a block diagram showing the structure of the locally decoding unit 204 shown in FIG. 2.

In FIG. 3, reference numeral 211 designates inverse quantization control information which is output from a mode interpreter unit 210 so as to control the inverse quantization characteristic of an inversely quantizing unit 213, reference numeral 212 designates interpolation control information which is output from the mode interpreter unit 210 so as to control the interpolation characteristic of an interpolating unit 215, reference numeral 214 designates a sub-sample decoded block which is output from the inversely quantizing unit 213, and 216 an average value information separation decoded block which is output from the interpolater unit 215. The mode interpreter unit 210 interprets the mode information 8 and outputs the inverse quantization control information 211 and interpolation control information 212. The inversely quantizing unit 213 performs an inversely quantizing operation on the approximate block 10 in accordance with the inverse quantization control information 211. The interpolating unit 215 performs an interpolation processing on the sub-sample decoded block 214 in accordance with the interpolation control information 212. An average value information adding unit 217 adds the average value information 5 to the average value separation decoded block 216 to thereby output the locally decoded block 205.

FIG. 4 is a block diagram showing the structure of the second encoding unit 206 which is employed in FIG. 2.

In FIG. 4, reference numeral 221 designates a transformed coefficient block which is output from an orthogonal transformation unit 220, reference numeral 223 designates mask information which is output from a mask information generating unit 222 and is used to judge the significance/insignificance of the transformed coefficient block 221, 225 a selected coefficient block which is judged for the significance/insignificance thereof by a coefficient selecting unit 224, and reference numeral 227 designates a quantized coefficient block which is quantized by a quantizing unit 226. The orthogonal transformation unit 220 orthogonally transforms the locally decoded pixel block 205 and outputs the transformed coefficient block 221. The mask information generating unit 222 outputs the mask information 223 showing the significance/insignificance of the coefficient for each coefficient position in correspondence to the mode information 8. The coefficient selecting unit 224 outputs the select coefficient block 225 with the coefficient at the coefficient position judged insignificant by the mask information 223 expressed at 0. The quantizing unit 226 divides the coefficients in the select coefficient block 225 by quantizing steps which are previously determined every coefficient position and outputs the quantized coefficient block 227. An entropy encoding unit 228 entropy encodes the quantized coefficient block 227 to thereby obtain the second code data 102.

Next, description will be given of the first embodiment of the invention with reference to FIGS. 1, 2, 3 and 4. However, the operation of the image signal encoding unit 100 has been previously set forth in the description of the related art in the present specification and thus the description thereof is omitted here.

As shown in FIG. 18, the code data 12, which is output from the image signal encoding unit 100, consists of the mode information 8, average value information 5, and approximate block information 10. Further, the mode information 8 is composed of the waveform information 18 and gain information 27. In the separation unit 200 in FIG. 2, the mode information 8, average value information 5 and approximate block 10 are separated.

In the mode interpreter unit 210 shown in FIG. 3, the waveform information 18 of the mode information 8, which is a resolution approximate parameter, is separated from the gain information 27 of the mode information 8, which is a gradation approximate parameter. From the waveform information 18, a direction of interpolation can be determined uniquely in correspondence to a sub-sample pattern in encoding. The is obtained the interpolation control information 212 which controls the interpolation operation of the interpolating unit 215 in correspondence to the interpolation direction is obtained. Also, from the gain information 27 of the mode information 8, it is possible to determine the characteristic and the number of levels of the inverse quantization respectively corresponding to the number of levels of quantization uniquely. The inverse quantization control information 211 is obtained to control the inverse quantization operation of the inversely quantizing unit 213 in correspondence to the characteristic and level number of the inverse quantization.

In the inversely quantizing unit 213 shown in FIG. 3, inverse quantization is performed on the approximate block 10 by use of the inverse quantization characteristic and level number which are notified by the inverse quantization control information 211, and the sub-sample decoded block 214 is output. The characteristic and level number of the inverse quantization are respectively prepared according to the adaptive quantizer 34 shown in FIG. 16.

In the interpolating unit 215 shown in FIG. 3, the sub-sample decoded block 214 is interpolated by means of an interpolation operation to be notified by the interpolation control information 212, and the average value separation decoded block 216 is output. Combinations of interpolation operations are prepared according to the sub-sample patterns of the adaptive sub-sampler 32 shown in FIG. 16.

Figure 5:
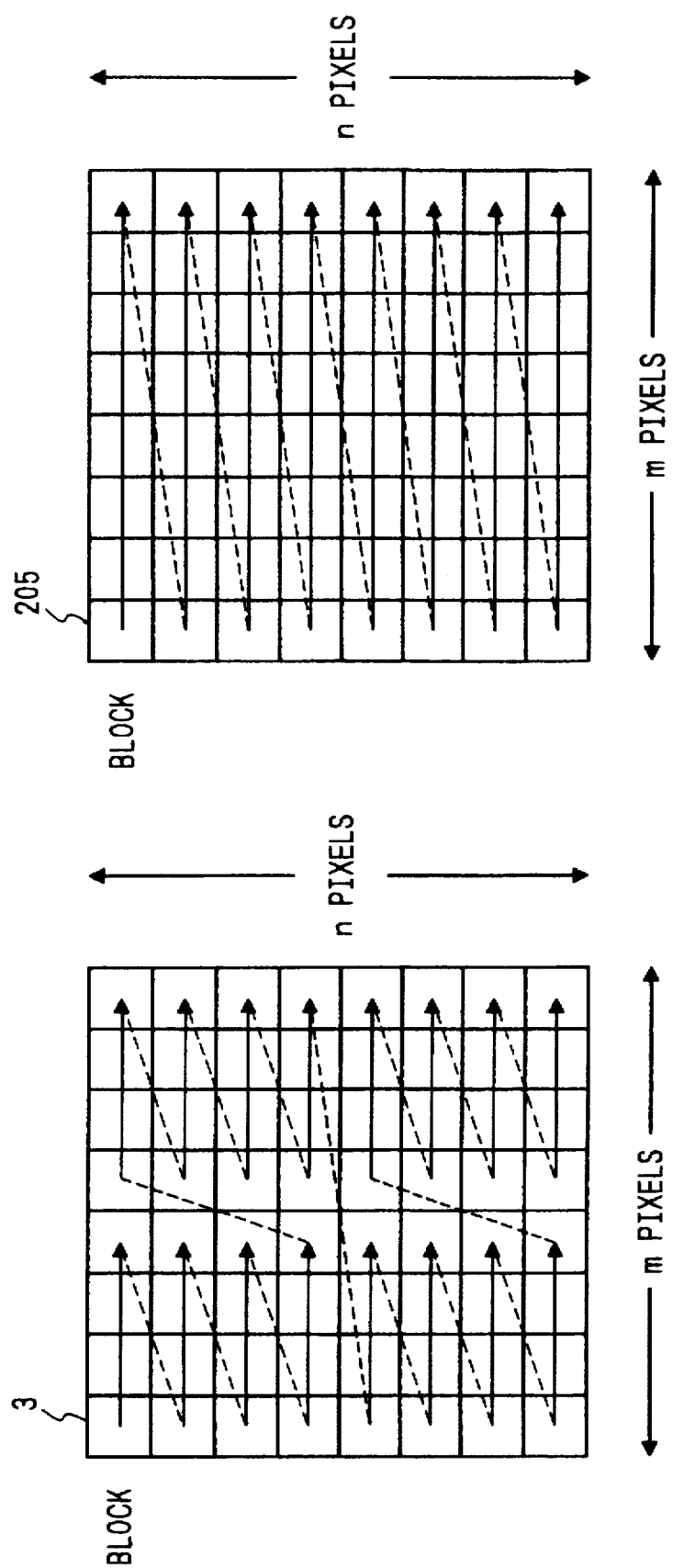
FIG. 5 is a view showing scan transformation.

In the average value adding unit 217 shown in FIG. 3, the average value information 5 is added to the respective pixel values of the average value separation decoding block 216 to thereby output the locally decoded pixel block 205 of mxn pixels. Here, the locally decoded pixel block 205 is output in a block scan sequence shown in FIG. 5.

Next, description will be given below of the second encoding unit 206 by use of FIG. 4.

In the orthogonal transformation unit 220, two-dimensional orthogonal transformation is performed on the locally decoded pixel block 205 of mxn pixels and the transformed coefficient block 221 is output. In FIG. 6, there are shown examples of pixel blocks and transformed coefficient blocks to be input. The numeral values of the pixel blocks respectively show the pixel values and the numeral values of the transformed coefficient blocks respectively show the values of the transformed coefficients.

The mask information generating unit 222, in accordance with the waveform information 18, which is the resolution approximate parameter and the gain information 27, which is the gradation approximate parameter, respectively included in the mode information 8, outputs the mask information 223 which shows the significance/insignificance of the respective coefficients of the transformed coefficient block 221. This is a processing which estimates the signal distribution of a frequency area from the spatial characteristic of the image signal, i.e., the results of analysis of the resolution and gradation thereof.

For example, as shown in FIG. 6(A), in a pixel block in which the gradation thereof varies in a horizontal direction, the coefficient electric power after the orthogonal transformation centers on the first row as shown in FIG. 6(a). Also, as shown in FIG. 6(B), in a pixel block in which the gradation thereof varies in a vertical direction, the coefficient power after the orthogonal transformation centers on the first column as shown in FIG. 6(b). Such uniform gradation variations as in FIG. 6(A) and (B) are rare and the power is dispersed in other coefficients as well. However, when the horizontal- or vertical-direction gradation variations prevail, the coefficients in the neighborhood of the first row or in the neighborhood of the first column are respectively important in reproduction of the image quality. On the other hand, as shown in FIG. 6(C), when the edges exist in an oblique direction, the power is distributed in a wide range centering around the diagonal components of the transformed coefficient block as shown in FIG. 6(c). In this case, in reproduction of the image quality, the number of the coefficients to be selected is increased when compared with those of the cases shown in FIGS. 6(a) and 6(b).

From the direction of the sub-sample, that is, from the directional property of interrelation between pixels in the pixel blocks, it is possible to know whether the electric power distribution in the transformed coefficient block 221 is in the row direction, in the column direction, or in the diagonal direction. Also, due to the fact that the sub-sample rate shows the intensity of interrelation, it can be understood that, as the sub-sample rate gets higher, the electric power centers more collectively on specific coefficients in a low frequency area. From the quantization characteristic and level, the existence and size of the edge in the pixel block can be estimated.

As described above, in the mask information generating unit 222, from the sub-sample direction, sub-sample rate, quantization characteristic, and quantization level respectively obtained from the mode information 8, the mask information 223 showing the position of the coefficients necessary for reproduction of the image quality is decided and is output to the coefficient selecting unit 224.

Figure 7:
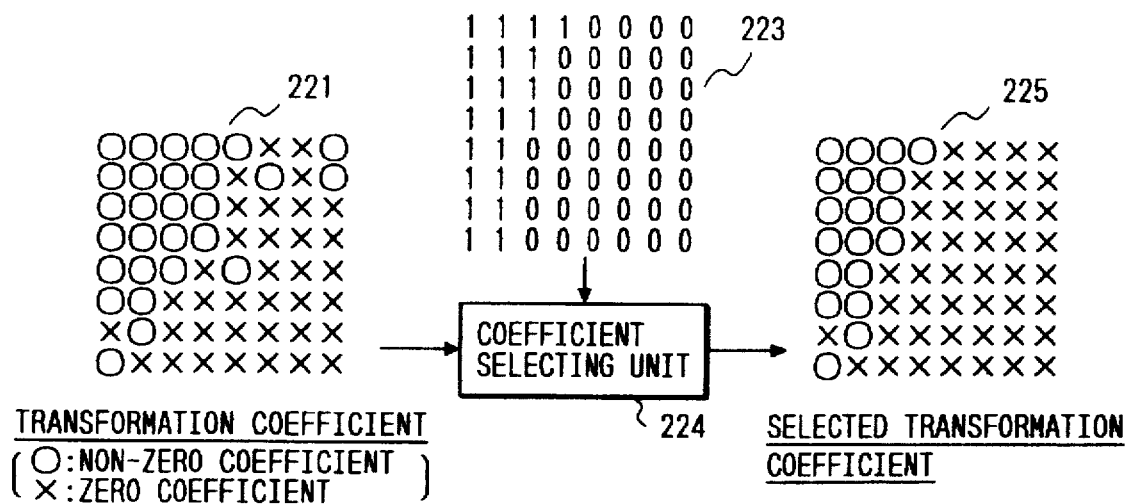
FIG. 7 is a view for explaining coefficient selection in the case of a two-dimensional orthogonal transformation of degree 8.

Description will be given below of the operation of the coefficient selecting unit 224 by use of FIG. 7. The mask information 223 shows whether each of the coefficients in the transformed coefficient block 221 is significant or insignificant, by means of "1", and "0" binary information for each coefficient position. As shown in FIG. 7, out of the coefficient block 221, only the coefficients existing at the positions corresponding to "1" in the mask information 223 are selected to thereby form the selected coefficient block 225.

The quantizing unit 226 quantizes the respective coefficients of the selected coefficient block 225 and outputs the quantized coefficient block 227. The quantizing processing can be shown by the following equation:

$$C(u,v) = \begin{cases} F(u,v) + (Q(u,v)/2)/Q(u,v) & (F(u,v) \geq 0) \\ F(u,v) - (Q(u,v)/2)/Q(u,v) & (F(u,v) < 0) \end{cases}$$

where F(u,v) expresses the selected coefficient block 225, Q(u,v) expresses quantizing steps, C(u,v) expresses the quantized coefficient block 227, and u,v expresses a position in the block, respectively.

Figure 8:
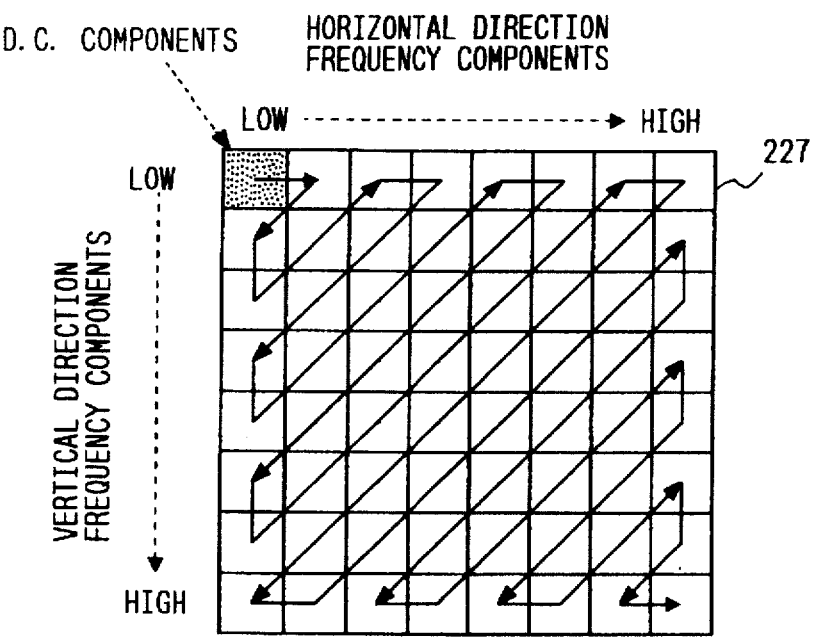
FIG. 8 is a view showing a transformation coefficient block and a coefficient scan sequence.

The entropy encoding unit 228 encodes the quantized coefficient block 227 by means of entropy encoding such as Huffman encoding, arithmetic encoding or the like, and outputs the second code data 102. FIG. 8, shows the quantized coefficient block 227. The coefficients in the block 227 are scanned in a zigzag within the matrix as shown by solid arrows in FIG. 8 to thereby provide a one-dimensional coefficient line, and an encoding processing is executed in this sequence.

In the entropy encoding, at first, there are formed encoding symbols which are targets for code allocation. The symbols are formed individually by components according to the difference between the statistic properties of the direct current component and alternating current component. In the code allocation as well, the encoding is executed individually. For example, when performing the Huffman encoding, individual code tables are prepared such as a table for direct current components, a table for alternating current components and the like.

Description will be given below of a method of forming symbols for the direct current components. In the case of the direct current components, at first, there is obtained a difference between the direct current components of a previous block and a current block, and the resultant values are classified into groups according to FIG. 9. The numbers of the thus classified groups provide the encoding symbols. Also, the correspondence of the thus found difference values to the number of the groups is represented by a bit string (an additional bit) having the same number as the group number.

Next, description will be given below of a method of forming symbols for the alternating current components. As shown in FIG. 8, the alternating current components except for the direct current components are scanned in a zigzag within the block. In this case, the encoding symbols are formed by a combination of a length (zero run) in which invalid coefficients (zero coefficients) continue until a valid coefficient (of which value is not 0) appears, and the group number obtained when the valid coefficients are classified into groups (however, the group 0 is not to be used) similarly to the direct current components.

When the maximum length of the zero run is limited to 15 and the group number is also limited to 15, then there can be formed a table of 256 encoding symbols as shown in FIG. 10. Similarly to the case of the direct current components, the actual correspondence of the coefficient values to the group number is indicated by the additional bit.

When Huffman encoding is used, by allocating codes according to the appearance probability of the symbols formed in the above-mentioned procedures, the second code data 102 is formed.

Figure 11:
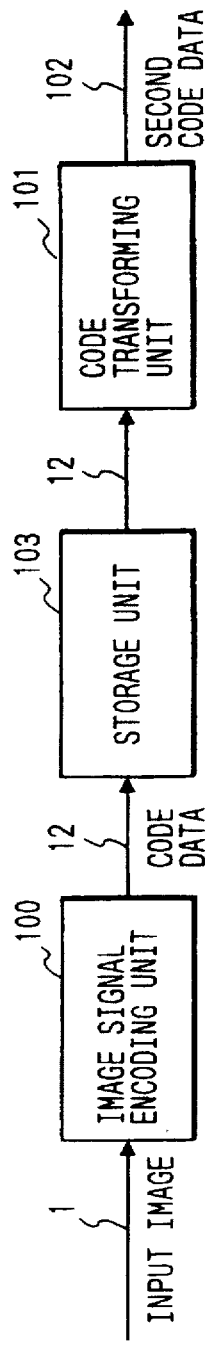
FIG. 11 is a block diagram showing the structure of a second embodiment of the image signal encoding device according to the invention.

FIG. 11 is a block diagram showing the structure of a second embodiment of the image signal encoding device according to the invention. In FIG. 11, a storage unit 103 is situated between the image signal encoding unit 100 and code transforming unit 101 to store the code data 12 temporarily.

Due to provision of the storage unit 103, it is possible to transform only the part of the input image 1 into the second code data. Also, it is possible to perform an editing operation on the code data 12 on the storage unit 103.

As has been described heretofore, according to the present invention, the following effects can be provided.

(1) Due to the fact that the code data can be re-encoded into the second code data of a higher compressibility by the code transforming unit, the data can be transmitted and stored efficiently.

(2) Due to provision of the mask information generating unit, there can be generated the mask information which is used to discriminate between the significant and insignificant coefficients of the transformed coefficient block in accordance with the mode information, and the coefficient selection is made in the coefficient selecting unit. This can improve the image quality deterioration of the edge portion.

(3) By employing as the second encoding unit a well-known encoding technology based on transformation encoding, there can be secured the changeability of data with other image processing devices.

(4) Since a second encoding operation in a frequency space is performed by a first encoding operation in a pixel space, the first encoded information does not need to be restored but, while the first encoded information is left as it is, an encoding operation can be performed in the next stage, so that a two-stage high compression can be executed in a simple structure. Here, it is noted that the common processing unit is employed in the first and second encoding operations and the first encoded signal is supplied directly to the second encoded signal. Namely, the common processing block is determined under the condition that it represents the distribution/dispersion condition of the characteristic distribution of image and it is suited for real-time processing. Accordingly, for example, even if the first encoded signal is once stored in a page memory, the real-time processing can be performed. Thus, the two-stage high compression can be executed entirely in a real-time manner and at a high speed. As has been described above, in the invention, the first and second encoding algorithms which are different from each other are related so as to be compatible with accuracy and compressing ratio. This could not be accomplished in the conventional techniques.

(5) Due to the fact that the first encoding is executed by mode discrimination in the pixel space and the second encoding is executed by making use of the mode discrimination results for processing coefficients in a processing space, it is possible to transform the second encoding in the frequency space with accuracy in a simple mode discriminating structure, without adding any means for the second encoding operation. Here, it is noted that the common processing block unit is employed in the first and second encoding operations. Namely, since the two-stage compression is executed for the common processing block, high compression can be accomplished without degrading the image quality.

(6) Since the second encoded results do not contain the mode discrimination information, a special receiving device is not required.

(7) For example, when image information is to be transmitted in the JPEG international standard system from a device which is provided at a transmitting side and has a compression function, it is possible to reduce image deterioration due to the second encoding in a frequency space of a device at the international standard system side which does not have a mode discrimination function. Also, as the receiving device, any device can be used, provided that it is in conformity with the JPEG international standard system.

Due to the above-mentioned effects, by combining the present invention with the proposed encoding method which aims at reducing a page memory, an efficient image data encoding method is realized.

Also, by providing the memory unit between the image signal encoding unit and the code transforming unit, the partial code transformation of an image as well as the code transformation after the editing processing are possible, which saves a processing on the unnecessary image data.

What is claimed is:

1. An image signal encoding device comprising:

dividing means for dividing an image signal into a plurality of rectangular pixel blocks;

average value separator means for calculating an average value of pixels in each of the pixel blocks and subtracting the average value from each of the values of the pixels of the pixel block;

mode discriminator means for analyzing characteristics of resolution and gradation variations in an average value separation pixel block obtained by said average value separator means and outputting mode information which is defined in correspondence to the characteristics of the pixel distribution in the average value separation pixel block;

first encoding means for encoding the average value separation pixel block by means of a first encoding operation which is defined by the mode information;

multiplexer means for multiplexing the encoded results output from said first encoding means, the average value output from said average value separation means, and the mode information and outputting first code data;

separation means for separating the mode information from the first code data;

locally decoding means for locally decoding the first code data by means of a decoding operation corresponding to the mode information and outputting a locally decoded pixel block; and second encoding means for encoding the locally decoded pixel block by means of a second encoding operation corresponding to the mode information and outputting second code data, an encoding method used for the second encoding operation being different from an encoding method used for the first encoding operation.

2. An image signal encoding device comprising:

dividing means for dividing an image signal into a plurality of rectangular pixel blocks;

average value separator means for calculating an average value of pixels in each of the pixel blocks and subtracting the average value from each of the values of the pixels of the pixel block;

mode discriminator means for analyzing characteristics of resolution and gradation variations in an average value separation pixel block obtained by said average value separator means and outputting mode information which is defined in correspondence to the characteristics of the pixel distribution in the average value separation pixel block;

first encoding means for encoding the average value separation pixel block by means of a first encoding operation which is defined by the mode information;

multiplexer means for multiplexing the encoded results output from said first encoding means, the average value output from said average value separation means, and the mode information and outputting first code data;

separation means for separating the mode information from the first code data;

locally decoding means for locally decoding the first code data by means of a decoding operation corresponding to the mode information and outputting a locally decoded pixel block; and second encoding means for encoding the locally decoded pixel block by means of a second encoding operation corresponding to the mode information and outputting second code data, said second encoding means further comprising:

mask information generating means, in accordance with the mode information, for outputting as mask information binary patterns which are used to judge the significance/insignificance of respective coefficients in a transformed coefficient block corresponding to the locally decoded pixel block;

coefficient selecting means for judging the significance/insignificance of the respective coefficients in the transformed coefficient block by use of the mask information and outputting a selected coefficient block in which the transformed coefficients of the transformed coefficient block that are judged insignificant are expressed as 0;

quantizing means for quantizing the respective coefficients of the selected coefficient block and outputting a quantized coefficient block; and entropy encoding means for entropy encoding the quantized coefficient block and outputting the second code data.

3. The image signal encoding device as set forth in claim 1, further comprising storage means for storing the first code data output from said multiplexer means between said multiplexer means and said separation means.

4. The image signal encoding device as set forth in claim 2, further comprising storage means for storing the first code data output from said multiplexer means between said multiplexer means and said separation means.

5. The image signal encoding device as set forth in claim 1, wherein the first encoding means is based on a block approximation encoding method.

6. The image signal decoding device as set forth in claim 1, where the mode information includes waveform information and gain information.

* * * * *